United States Patent
Klaymar

(10) Patent No.: US 6,413,018 B1
(45) Date of Patent: Jul. 2, 2002

(54) METHOD FOR SUPPORTING A PIPELINE IN A TRENCH

(75) Inventor: Edward J. Klaymar, Monroeville, PA (US)

(73) Assignee: KNI Incorporated, Homer City, PA (US)

( * ) Notice: Subject to any disclaimer, the term of this patent is extended or adjusted under 35 U.S.C. 154(b) by 0 days.

(21) Appl. No.: 09/900,371

(22) Filed: Jul. 6, 2001

(51) Int. Cl.[7] ................................................. F16L 1/06
(52) U.S. Cl. ..................... 405/184.4; 405/157; 405/179
(58) Field of Search ........................... 405/184.4, 179, 405/174, 157, 154.1; 138/97

(56) References Cited

U.S. PATENT DOCUMENTS

| | | | |
|---|---|---|---|
| 2,707,984 A | * | 5/1955 | Goff .......................... 405/184.4 |
| 2,987,891 A | * | 6/1961 | Phillips ........................ 405/283 |
| 3,380,258 A | * | 4/1968 | Young .......................... 405/157 |
| 3,563,825 A | | 2/1971 | Segura et al. |
| 3,655,564 A | * | 4/1972 | Barrington .................... 405/157 |
| 4,063,429 A | | 12/1977 | Wilson |
| 4,068,488 A | | 1/1978 | Ball |
| 4,069,684 A | | 1/1978 | Wilson |
| 4,343,573 A | * | 8/1982 | Breitfuss ....................... 405/179 |
| 4,488,836 A | | 12/1984 | Cour |
| 4,806,049 A | | 2/1989 | Cour |
| 4,918,885 A | | 4/1990 | Trumble et al. |
| 5,765,967 A | | 6/1998 | Klaymar |
| 5,988,227 A | | 11/1999 | Magoffin |

\* cited by examiner

*Primary Examiner*—Thomas B. Will
*Assistant Examiner*—Frederick L. Lagman
(74) *Attorney, Agent, or Firm*—Buchanan Ingersoll, P.C.

(57) ABSTRACT

A method for supporting an underground pipeline in an excavated trench. The method involves supporting the pipeline on specially-designed support benches at spaced intervals. The benches are designed to fail when exposed to a predetermined load, which load will be placed on the benches at some point during the backfilling of the trench or when the pipeline undergoes hydrostatic testing. When the benches fail, the fill under the pipeline is compacted and thereby supports the pipeline in lieu of the support benches.

19 Claims, 3 Drawing Sheets

METHOD FOR SUPPORTING A PIPELINE IN A TRENCH

FIELD OF THE INVENTION

This invention relates to the art of pipelines, and specifically, pipelines which are buried in underground trenches along their length.

BACKGROUND OF THE INVENTION

Pipelines are used to transport fluids, typically oil, gas and other petroleum products, across long distances. In the current art of installing new pipelines, the pipe is lowered into trench and laid on top of the support benches, which are spaced along the length of the trench floor. The trench containing the newly laid pipe is then backfilled normally in two stages. A layer of uniform, rock-free subsoil is introduced into the trench so that it flows around and beneath the pipe between the spaced support benches, fills up the open area between the sides of the pipe and the trench walls, and covers the pipe to a specified height over the pipe. In the art this procedure is termed "pipeline padding" or "padding". The second backfill stage is to then utilize the remaining spoil previously excavated from the trench to complete the trench backfill. After the backfilling is completed, a hydrostatic test is conducted. The pipe is filled with water and placed under high pressure for a period of time, usually 24 hours, in which the pressure is monitored and the pipe section is tested for leaks.

After the pipeline has been installed and hydrostatically tested an additional test is conducted. Devices called "sizing pigs" are sent through the pipe. It is during this procedure that damage to the pipe is found and identified. All dents and buckles as well as most "out-of-round" sections must be dug up and repaired before the pipeline can be placed into service. This repair work is very expensive and time consuming. The support benches hold the pipeline above the trench floor both during backfilling and while the pipe is in service. Because rocks on the trench floor may dent the pipe or damage the protective coating on the outside of the pipe, it is very important that the pipe does not come into contact with the trench floor during service as well as during installation. Sandbags are commonly used as support benches. These bags are can be stacked to any desired height. Another popular bench material is high density foam blocks. These blocks are strong enough to support the pipeline without collapsing. U.S. Pat. Nos. 4,068,488 to. Ball discloses the use of inflatable support pads that temporarily support the pipeline during backfilling. These bags are removed as the backfill material approaches the bag during backfilling. The patent calls for a granular bedding/padding material to be forcibly injected under the pipe to obtain full compaction. The bedding, being fully compacted prior to the removal of the temporary pad, will then support the pipe at the same pipe position. U.S. Pat. Nos. 4,488,836 and 4,806,049 to Cour disclose the use of bags filled water to install pipeline in ocean bottoms or trenches that are not stable. The purpose of which is to keep the trench walls from collapsing before the pipe can be installed. The pipe is then laid on top of the pressurized bladder which has filled the trench. The bladder is then deflated allowing the pipe to drop down to the unpadded trench floor while, as the pipe is being lowered, the unstable trench walls would collapse inward on top of the pipe. All three patents teach that the pipe is placed on the filled bag or bags, and then the bag is deflated, allowing padding or the bottom of the trench material to support the pipe. Each bag has a valve that is opened to allow deflation. Such air filled and water filled bags are more expensive than sandbags and foam blocks. Consequently, they are seldom used.

To insure that the pipe support benches perform the function of supporting the pipe above the trench floor for operating pipelines, it will be apparent to one of skill in the art that the benches must be constructed to be strong enough and be spaced close enough together so that the benches can adequately support more than the weight of the actual pipe itself. After the support benches are placed along the trench floor they will be subjected to the accumulative loads of the pipe itself, the fill material and the contents of the pipe.

FIG. 1 shows a typical pipeline installation of the prior art before backfilling. The pipeline 12 is supported on spaced apart benches 13 placed on the floor of a trench 14. For illustrative purposes, consider a steel pipe 36 inches in outer diameter with a wall thickness of 0.500 inches and with support benches located at 15 foot intervals along the trench floor, as shown in FIG. 1. When the pipe is laid on top of the spaced support benches, each support bench will experience a load of 2,860 pounds, assuming each bench will support an equal weight. As the trench is backfilled, the support benches will experience additional loading above the weight of the pipe alone. For the purposes of this example, we can estimate the additional loading during backfill to approximate ½ of the weight of the pipe. Employing this approximation, each bench will now experience a load of 4,290 pounds, again assuming each bench will support an equal weight. After the trench has been backfilled, the pipe is then filled with water and hydrostatically tested. In this example and again assuming equal bench weight distribution, each support bench will experience an additional load of 6,250 pounds for a total weight of approximately 10,540 pounds.

In the above example, dynamic loading has been ignored and it was assumed that each bench will experience equal loading. In the actual practice of installing pipelines, however, dynamic loading and unequal bench loading can exist. For example, if the bottom surface of a section of pipe does not align with the surface of the trench floor, it may be possible for individual support benches to experience increased loading several times as great as those shown in the above example. In FIG. 2, the bottom surface of the pipe 12 is shown to be out of alignment with the trench floor. As a result, support benches 1 and 4 are supporting the entire weight of the pipe section and the pipe is suspended above support benches 2 and 3. Support benches 1 and 4 are therefore supporting approximately twice the weight that would otherwise be supported had non-alignment not occurred. Pipeline installers are supposed to carefully observe pipeline installation to assure that the pipeline is supported by all of the benches. If gaps are seen like those in FIG. 2 the installer is required to lift the pipeline and insert one or more shims 15 as shown in FIG. 3. However, it is quite common for the installer to miss or even ignore gaps between benches and the pipeline especially when using expanded polystyrene benches.

With the necessity of insuring that the bottom surface of the pipe does not come into contact with the trench floor, and the risks of expensive pipe damage if it does contact the trench floor, the current method is to provide support benches constructed strong enough to support the entire expected loading calculated as in the above example plus an appropriate safety factor multiplier. Therefore, each bench will support the total weight or loading, namely, the weight of the empty pipe, the weight of the backfill, the weight of the water filled pipe during hydrostatic testing, the dynamic loading, and the increased weight caused by unequal bench loading. However, constructing the support benches rigid enough and placing the benches close enough together to support the total weight or loading as practiced in the current art makes it very likely that the position of the pipe after it has been initially lowered into the trench and placed on the support benches will remain fairly constant. That is, the height of the bottom surface of the pipe above the trench floor when the pipe is initially laid on top of the support benches will remain the same (or very nearly so) throughout the pipeline installation and testing processes.

As previously described, immediately after the pipe has been placed on top of the support benches, rock-free subsoil is introduced into the trench so that it flows around and under the pipe into the open area beneath the pipe between the support benches. Because the support benches have been constructed rigid enough to support the additional loads experienced after the placement of the padding material, the pipe cannot move to a position sufficiently low enough to compact the padding material beneath the pipe. Because the padding material beneath the pipe is not compacted, it will be readily affected by water, thus contributing to the well known problem of padding wash-out. Furthermore, when the padding material is not compacted, the pipe has no additional support after installation. Consequently, the installed pipe is supported by only the support benches themselves. In normal practice, it is not unusual that a typical underground pipeline be actually supported along less than 10 percent of its length. Unequal support bench loading can cause individual or a series of individual benches to be subjected to tremendous loading. Sometimes unequal loading has occurred in the practice of installing underground pipelines to such a degree that individual, or a series of individual benches fail, thereby allowing that particular section of pipe to drop to the trench floor.

Size and costs are other serious concerns with having the support benches constructed to support the total weight or loading on the pipe. It is necessary that these individual benches have a large enough surface area to prevent the pipe from being subjected to resultant point loading sufficient enough to cause the pipe to be flattened or ovalized (out-of-round). Should that occur an expensive dig-up and repair would be necessary.

Consequently, there is a need for a method of installing pipeline that permits installation without resultant uneven loading of support benches and yet is no more expensive or complicated than current installation methods.

SUMMARY OF THE INVENTION

I provide a method of installing pipeline using benches strong enough to support the pipe after the pipe has been lowered into the trench and padded. However, as opposed to the practice of the current state of the art, the benches are constructed to fail when additional cumulative loading produced by complete backfill and hydrostatic testing is applied. This method will accomplish beneficial outcomes not seen in the current art. A pipeline installed according to the present invention will be supported by the padding material beneath the pipe between the benches. As a result, a much greater percentage of the actual pipe will be supported. Further, the padding material beneath the pipe will be compacted, thereby greatly reducing the well-known problem of padding wash-out.

DETAILED DESCRIPTION OF THE PREFERRED EMBODIMENTS

Referring to FIGS. 5 through 9, I provide a support bench 20 that is cube-shaped or a rectangular solid. If desired, a concave surface can be provided on the top of the bench. Preferably the bench has a height equal to or greater to the distance above the trench floor at which the pipe is to be positioned. Commonly, this distance is 12 inches. For that reason FIG. 4 identifies the height of the bench as 12", but it should be understood that the bench could be any desired height. Furthermore, although the figures show the pipe being supported by a support bench constructed of a single block at each support location, it should be understood that two or more blocks could be stacked to create a support bench. Unlike the benches of the prior art, bench 20 is constructed and sized to fail at a pre-determined weight loading. This weight will be a function of the material and dimension of the actual pipe, as well as the intended spacing between the support benches.

Figure 1:
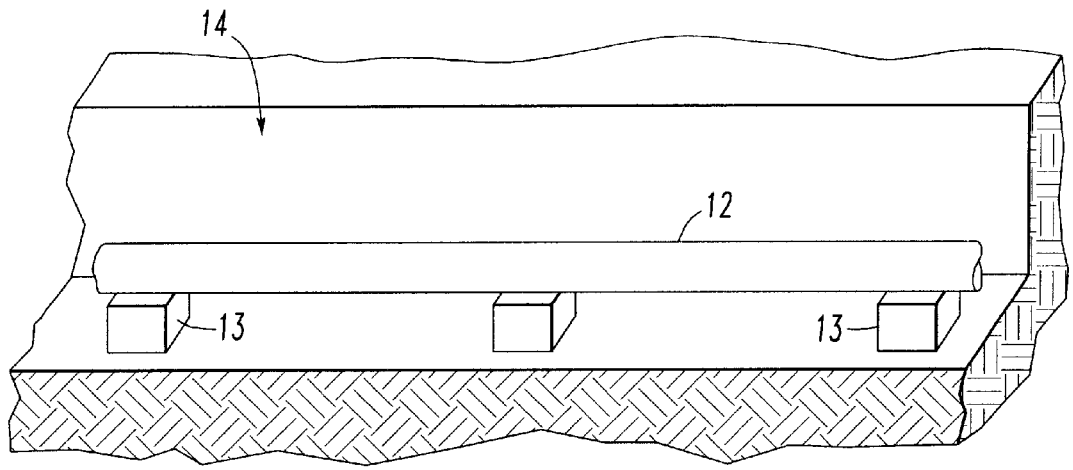
FIG. 1 is a diagram showing a pipeline supported by spaced benches according to the prior art
Figure 2:
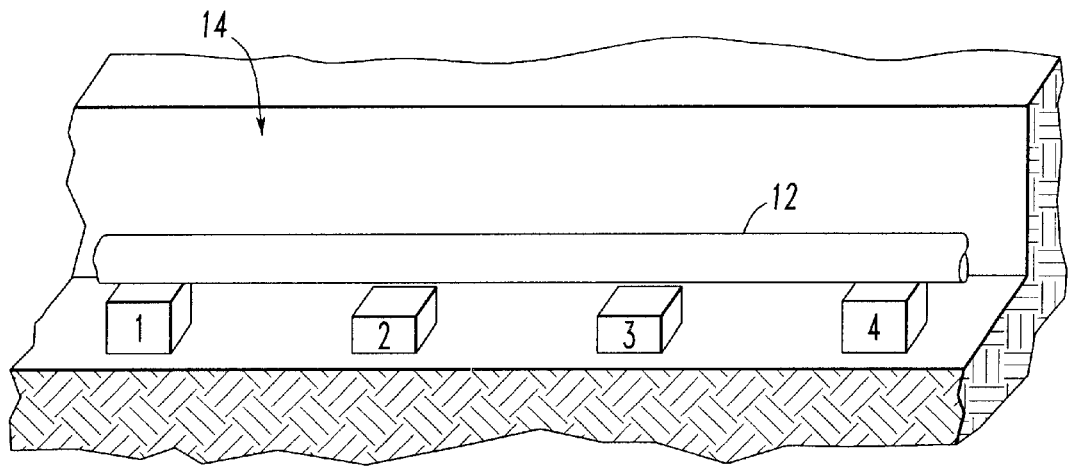
FIG. 2 is a diagram similar to FIG. 1 illustrating the problem of unequal dynamic loading that occurs when the bottom of the pipeline is not aligned with the floor of the excavated trench.
Figure 3:
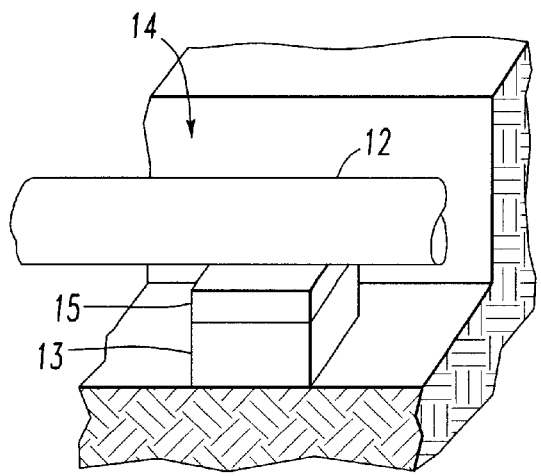
FIG. 3 is a diagram similar to FIGS. 1 and 2 showing a support bench with a shim used to correct the problem shown in FIG. 2.

To install a pipeline in accordance with the present invention the support benches are placed into the trench at spaced apart locations on the trench floor. The pipe is then lowered into the trench and placed on top of the support benches in a manner so as to insure that the support benches will experience little or slight dynamic loading. The previously described condition of unequal support bench loading must be avoided. To prevent unequal bench loading from occurring, it is necessary to employ measures to correct non-alignment. Sections of pipe which do not align with the trench floor will be apparent during the lowering-in of the pipe. The lowering-in operation should be observed and monitored and when it is seen that the bottom surface of the pipe does not come into contact with a particular support bench, the lowering-in operation should be stopped, the pipe should be lifted, and an appropriate size shim should be installed on top of that support bench, as shown in FIG. 3. This procedure should be repeated throughout the complete lowering operation to make certain that every support bench is providing support to the pipe.

After the pipe has been lowered into the trench and placed on the support benches as described above, padding material is placed into the trench according to conventional practice. However, the padding operation should be closely monitored to insure that padding material completely fills in the open area beneath the pipe between the support benches. To eliminate the possibility of bridging, it is suggested that the padding material be introduced into the trench in such a manner that the padding material flows on both sides of the pipe somewhat equally. That should assure that the padding material enters the open area beneath the pipe from both sides. Furthermore, it is suggested that the padding material also be introduced in such a way that the padding material will be flowing into the area beneath the pipe in a constantly forward direction in a continuous manner. That is, the open area beneath the pipe will be filled in front of and before the padding material builds in the open trench and fills in the area between the pipe and the trench walls. As the padding material is introduced to the trench in this manner, the padding material, as it is building up in the trench, will also flow forward, filling in the open area beneath the pipe first. This procedure will eliminate the possibility of bridging in which case padding material would be prevented from entering the area immediately beneath the pipe, thereby creating "void" areas. In this regard, it has been shown that if padding material is dumped from the side of the trench quickly so that a volume or batch of padding material is introduced suddenly, bridging often occurs. By following this procedure, the pipe will be supported fairly equally by all support benches. Somewhat loose and non-compacted padding material will have filled in the area immediately beneath the pipe, and the pipe will have been prevented from coming into contact with the trench floor.

Figure 6:
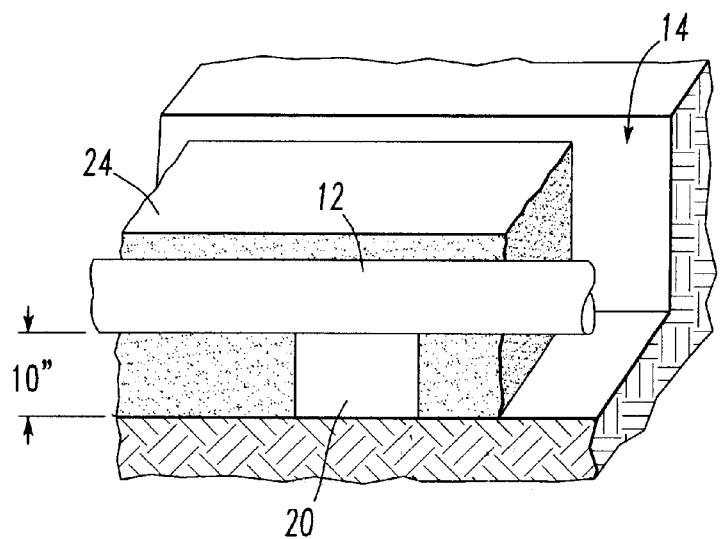
FIG. 6 is a perspective view showing the pipeline and support bench of FIG. 5 with padding material added.
Figure 7:
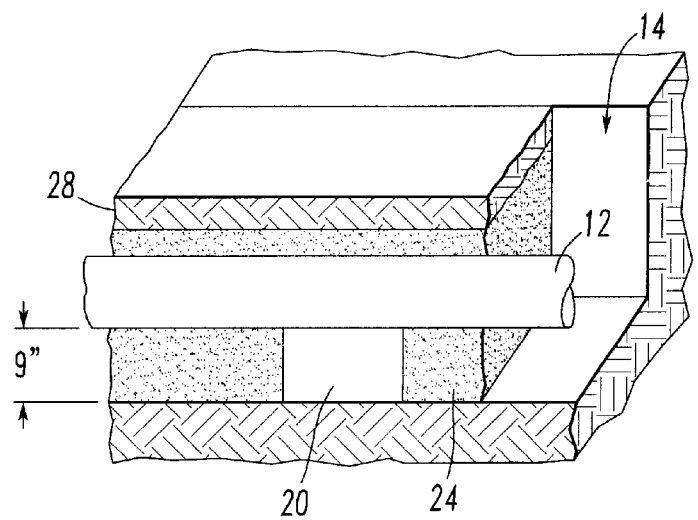
FIG. 7 is a perspective view showing the pipeline and support bench of FIG. 6 with complete backfill added, thereby further compressing the support bench.

When the pipe 12 is placed on top of the bench 20, the resultant load may cause some calculable deformation of the support bench. Further deformation may occur when backfill material is placed on top of the pipe. Consequently, FIGS. 6 and 7 show the height of the support bench that was originally 12" to be 10" after placement of the pipe and 9" after backfilling.

As described previously, the largest load and the largest single increase in loading occurs when the pipe is filled with water for hydrostatic testing. According to a preferred embodiment of this invention, the support benches are to be designed to fail to support this loading. In the installation of 36 inch steel pipe discussed above the bench would be designed to fail when subjected to a weight of 10,540 pounds. It should be noted, however, that the support bench could be designed to fail anytime after the area beneath the pipe has been properly padded. For example, the benches could fail upon placement of the backfill material on top of the pipe. That would be at 4,290 pounds in the example. This allows a load design window in which the support benches are to fail. However, the benches must not fail during the lowering-and pipe placement or during padding operations. The benches may fail or not fail after padding material has been placed under the pipe while the trench backfill is completed. The benches must fail to support the total loading when the pipe is filled with water for hydrostatic testing.

As another example consider a steel pipe 24 inches in outer diameter with a wall thickness of 0.375 inches and with support benches located at 15 foot intervals along the trench floor. When the pipe is laid on top of the spaced support benches each support bench will experience a load of 1,420 pounds assuming each bench supports an equal weight. As the trench is backfilled, the support benches will experience additional loading. For the purposes of this example, we can estimate the additional loading during backfill to approximate ½ of the weight of the pipe. Employing this approximation, each bench will now experience a load of 2,130 lbs., again assuming each bench is supporting an equal weight. After the trench has been backfilled, the pipe is then filled with water and hydrostatically tested. Again assuming equal bench weight distribution, each support bench will experience an additional load of 2,760 pounds for a total weight of approximately 4,890 pounds.

As yet another example, a steel pipe 36 inches in outer diameter with a wall thickness of 0.500 inches is placed on support benches located at 12 foot intervals. Assuming that each bench supports an equal weight, each bench would experience a load of 2,290 pounds when the pipe is placed on the benches. Estimating the backfill as providing half the weight of the pipe, each bench will carry a load of 3,435 pounds after backfilling. When the pipe is filled with water and hydrostatically tested an additional load of 5,000 pounds will be added to each bench. Therefore, the total weight at which the bench should fail is approximately 8,435 pounds.

It is the function rather than the composition of the support benches that is critical. Therefore, those skilled in the art will recognize that many different materials and bench constructions could be used. However, in general, it is contemplated that the support benches may be one of two general designs. First, the support benches may be constructed of a material which would remain rigid and not deform throughout all loading prior to failure. Such a bench may be a rigid homogeneous material such as a high density foam that shatters at a specific load. The bench could be a frame structure in which the top surface that receives the pipe is supported by legs that break or buckle at a specific loading. Preferably, the support benches are constructed of a material which would deform or flatten when subjected to increased loads, while still providing support, prior to failure. One such material would be expanded polystyrene. Support benches constructed of material showing these properties would produce a "soft" support bench versus a "hard" support bench.

Figure 4:
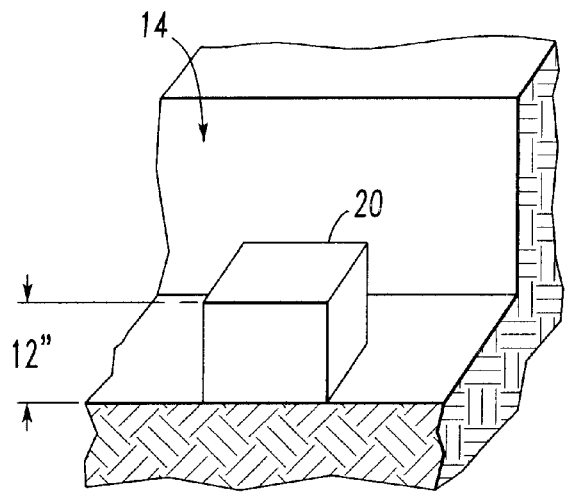
FIG. 4 is a perspective view of a support bench according to the present invention in place on a trench floor
Figure 5:
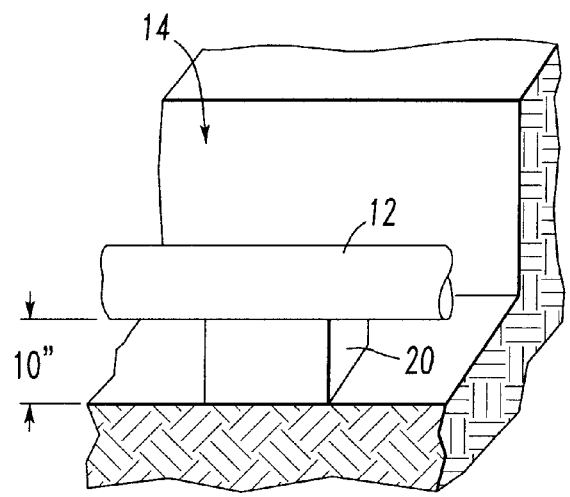
FIG. 5 is a perspective view similar to FIG. 4 showing a pipeline disposed on the support bench and compressing the support bench according to the present invention.
Figure 8:
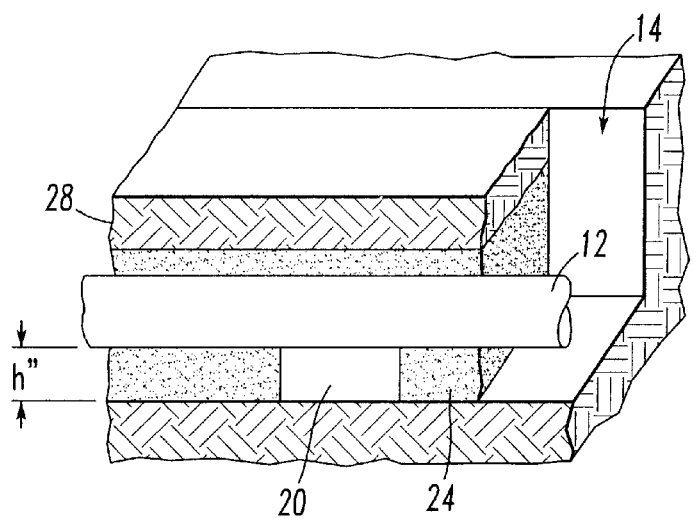
FIG. 8 is a perspective view showing the support bench fully compressed according to one embodiment of this invention.
Figure 9:
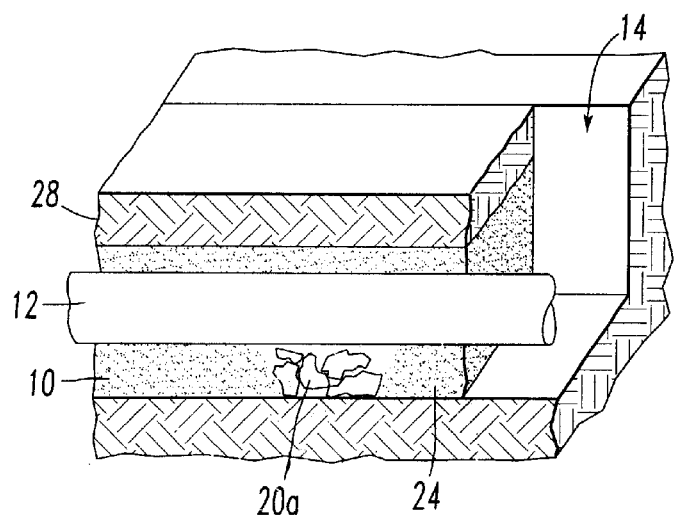
FIG. 9 is a perspective view showing the support bench under a condition of structural failure according to a second embodiment of this invention.

FIGS. 4 through 8 show a single soft support bench comprised of a material which would deform or flatten when subjected to increasing loads. In FIG. 4 a single support bench is shown to have a height of 12 inches The actual height of the benches is not germane to this invention, except that it should be sufficient to allow a desired amount of padding material to flow under the pipe. When the pipe is placed on top of the bench, the resultant load will cause some calculable deformation of the support bench. For descriptive purposes, in this example, the support bench has been deformed (flattened) two inches. Hence, FIG. 5 shows the pipe supported 10 inches above the trench floor. After padding material has been placed beneath the pipe, the pipe is still being supported by the support bench 10 inches above the trench floor. At that point there is loose, non-compacted padding material, shown as reference number 24 in FIG. 6, beneath the pipe between the benches. The padding material is providing zero support to the pipe. After the trench has been completely backfilled with fill material 28 the support bench is compressed. Consequently FIG. 7 shows the pipe 12 resting 9 inches above the trench floor. This lowering of the pipe a distance of one inch from the previous FIG. 6 compresses the non-compacted padding material 24 from a depth of 10 inches to a depth of 9 inches and provides a degree of compaction producing some support to the pipe by the padding material. The support benches are no longer supporting 100 per cent of the total load. When the pipe 12 is filled with water for hydrostatic testing after backfilling the support benches fail allowing the pipe to drop until padding material 24 beneath the pipe is fully compacted. After such failure the compacted material beneath the pipe is supporting 100% of the load. After such failure and compaction the pipe will be some distance h above the bottom of the trench. If the height had been 9" after backfilling as illustrated in FIG. 7, then h would be less than 9". This condition is illustrated in FIG. 8 where h is some distance smaller than the distance of the pipe above the trench floor prior to hydrostatic testing. In another embodiment the support bench is made of a material that will shatter or break into may pieces when subjected to a predetermined load. Such shattering could occur when the pipe is filled with water or when backfill is placed on top of the pipe. This embodiment would then be in multiple pieces 20a as shown in FIG. 9.

As the pipe drops lower, padding material 24 is compacted to a greater extent. In this condition, the padding material will be providing an increasing percentage of support while the support benches will be providing a decreasing percentage of support. It is entirely probable that, under the methods described here, the padding material will become fully compacted before the support bench would actually fail. The support bench as shown in FIG. 8 has been deformed and still is providing a share of the total support. Because the padding material is now fully compacted, the pipe can not drop any lower. Therefore, no further loading can be seen by the support bench, and the pipe is supported over 100% of its length.

Both of the preferred embodiments achieve the objective of providing greater support for a buried pipeline. In the embodiment illustrated by FIG. 9, the pipe is supported solely by the padding material beneath the pipe. This provides for the pipe to be supported along a much greater percentage of its length (approximately 90%) than that provided by the current art (approximately 10%). In the embodiment shown in FIG. 8, the pipe will be supported along 100% of its length. In both cases, however, the padding material beneath the pipe will have been fully compacted. Such full compaction does not occur when pipelines are installed using known support benches.

Another benefit which will be realized by this invention is that by designing and building support benches weaker than those required by the current art, material costs will be reduced as well. It is not unrealistic that this expense could be reduced by of 50 to 75%.

The examples given herein are meant for illustration purposes only and are not meant to limit the scope of the invention, which is properly delimited by the claims which follow.

I claim:

1. A method for supporting a pipeline in a trench comprising:

placing a plurality of support benches at spaced intervals along the length of said trench, said benches being designed to fail when a predetermined weight has been placed thereon;

placing said pipeline on said benches;

filling space under said pipeline, between said benches and around said pipeline to a predetermined height with a padding material;

applying a fill material over the padding material in said trench;

filling said pipeline with water; and allowing said plurality of support benches to fail such that said padding material provides support for said pipeline.

2. The method of claim 1 wherein said pipeline compacts said padding material after the failure of said support benches.

3. The method of claim 1 wherein said step of placing said benches includes spacing said benches such that each of said benches carries approximately a same weight.

4. The method of claim 3 further comprising:

checking each of said support benches to insure that said pipeline rests thereon; and installing shims on those of said benches which are not in contact with said pipeline, such that said pipeline contacts said shims.

5. The method of claim 1 wherein said step of filling with said padding material comprises:

introducing said padding material on both sides of said pipeline; and filling areas under said pipeline before said padding material fills areas between said pipeline and the walls of said trench.

6. The method of claim 5 wherein said padding material is a uniform material.

7. The method of claim 6 wherein said padding material is relatively rock-free.

8. The method of claim 1 wherein said step of allowing said plurality of benches to fail includes the step of allowing failure anytime after said padding material is introduced into said trench.

9. The method of claim 8 wherein said plurality of benches are designed to support a weight of said pipeline when said pipeline is empty, and to fail when additional weight is applied.

10. The method of claim 9 wherein said plurality of benches fail under at least one of weight of said fill material placed on the pipeline, and a combined weight of said fill material placed on the pipeline and water placed into the pipeline.

11. The method of claim 1 wherein said benches are constructed of a rigid material and are designed to structurally fail at a predetermined weight.

12. The method of claim 1 wherein said benches are constructed of a deformable material such that said benches compress when loaded.

13. The method of claim 12 wherein said benches are comprised of expandable polystyrene.

14. The method of claim 12 wherein said benches compress enough to allow said padding material to become compacted.

15. The method of claim 14 wherein said benches compress to a level within the trench of said compacted padding material.

16. The method of claim 15 wherein said pipeline is supported along its entire length by compacted padding material and compressed benches.

17. A method for supporting a pipeline in a trench comprising:

placing a plurality of support benches at spaced intervals along the length of said trench, said benches being designed to fail when a predetermined weight has been placed thereon;

placing said pipeline on said benches;

filling space under said pipeline, between said benches and around said pipeline to a predetermined height with a padding material; and applying force to the pipeline sufficient to cause said plurality of support benches to fail such that said padding material provides support for said pipeline.

18. The method of claim 17 wherein said force is applied by placing fill material on the padding material above the pipeline.

19. The method of claim 18 wherein said force is applied to the pipeline by placing a material in the pipeline.

* * * * *